United States Patent
Nakamura et al.

[11] Patent Number: 6,142,517
[45] Date of Patent: *Nov. 7, 2000

[54] SIDE IMPACT AIR BAG SYSTEM

[75] Inventors: Junichi Nakamura, Anjo; Tsutomu Ookochi, Okazaki; Noritaka Nagayama, Okazaki; Mikiharu Shimoda, Okazaki; Tosiyasu Hatta, Okazaki; Setuko Hatta, Okazaki, all of Japan

[73] Assignee: Mitsubishi Jidosha Kogyo Kabushiki, Tokyo, Japan

[*] Notice: This patent is subject to a terminal disclaimer.

[21] Appl. No.: 08/833,647

[22] Filed: Apr. 8, 1997

[30] Foreign Application Priority Data

Apr. 8, 1996 [JP] Japan .................................. 8-085176

[51] Int. Cl.⁷ .................................................. B60R 21/28
[52] U.S. Cl. ............................................................. 280/739
[58] Field of Search ........................... 280/730.2, 730.1, 280/729, 739, 743.1, 743.2

[56] References Cited

U.S. PATENT DOCUMENTS

| | | | |
|---|---|---|---|
| 5,447,326 | 9/1995 | Laske et al. | 280/728.3 |
| 5,454,595 | 10/1995 | Olson et al. | 280/743.1 |
| 5,556,128 | 9/1996 | Sinnhuber et al. | 280/730.2 |
| 5,570,900 | 11/1996 | Brown | 280/729 |
| 5,718,450 | 2/1998 | Hurford et al. | 280/730.2 |
| 5,730,464 | 3/1998 | Hill | 280/743.2 |
| 5,791,685 | 8/1998 | Lachat et al. | 280/743.1 |
| 5,853,191 | 12/1998 | Lachat | 280/730.2 |
| 5,890,732 | 4/1999 | Nakamura et al. | 280/729 |
| 5,924,721 | 7/1999 | Nakamura et al. | 280/730.2 |
| 5,927,750 | 7/1999 | Nakamura et al. | 280/730.2 |

FOREIGN PATENT DOCUMENTS

| | | |
|---|---|---|
| 0523704A1 | 1/1993 | European Pat. Off. . |
| 4430412C1 | 10/1995 | Germany . |
| 29517372U1 | 2/1996 | Germany . |
| 19541513A1 | 5/1996 | Germany . |
| 19517764A1 | 11/1996 | Germany . |
| 6227248A | 8/1994 | Japan . |
| 2299061A | 9/1996 | United Kingdom . |

*Primary Examiner*—J. J. Swann
*Assistant Examiner*—David R. Dunn

[57] ABSTRACT

In a side impact air bag system, a first vent hole and a second vent hole for reducing a pressure of a part opposing a chest portion of a passenger to a lower value than the pressure of a part opposing an abdomen portion of the passenger when the bag is inflated. The vent holes are provided on a side surface of an upper inflation unit opposite to the passenger, whereby regulating gas discharge of the part opposing the chest portion while preventing early discharge of the gas, always obtaining a desired internal pressure and inflation condition, positively inflating the bag and relaxing a shock to the chest portion. Further, the first vent hole and the second vent hole are formed at positions not contacting with vehicle compartment structural members, thereby preventing the vent hole and the second vent hole from being closed even when the vehicle compartment structural members are deformed toward the inside of the vehicle compartment, eliminating disturbance to gas discharge when the bag is inflated, and always obtaining the desired internal pressure condition.

18 Claims, 9 Drawing Sheets

SIDE IMPACT AIR BAG SYSTEM

FIELD OF THE INVENTION

This invention relates to an air bag for protecting a passenger (or a driver) when a shock is applied externally to the side of a vehicle.

BACKGROUND ART

When a shock is applied externally to the side of the vehicle due to a side impact or the like, the vehicle door or the vehicle structure may be deformed by the impact force depending on the magnitude of the shock. In order to relax the shock force to the passenger due to the deformation, various types of air bag are proposed which are inflated between the lateral face and the passenger when a side impact occurs, so that the shock force exerted on the passenger is absorbed by the air bag (e.g. Japanese Patent Laid-open Publication (OPI) 4-50052, Japanese OPI 4-356246, and so on).

A heretofore proposed side impact air bag system has an air bag folded up together with a gas generating device, both installed inside a vehicle seat (mainly in the seat back) to maintain the relative position to the passenger in a constant value, and is provided with detection means for detecting a side impact to blow the gas from the gas generating device. The air bag is provided with a vent hole for exhausting the gas from the bag after inflation, and an appropriate pressure for absorbing the shock is obtained by the vent hole. The vent hole is formed at a position for even gas exhaustion so that vibration at inflation is prevented and the air bag is uniformly inflated, for example, at a position symmetrical in the vertical direction when the air bag is inflated.

When a side impact is detected by the detection means, gas is instantaneously blown out from the gas generating device into the air bag to inflate the air bag towards the front side of the vehicle so that the air bag is present between the side of the vehicle and the passenger. Gas is discharged from the vent hole according to the load of door and the like deformed by the side impact to obtain an appropriate pressure to absorb the shock so that the shock to the passenger is absorbed to protect the passenger.

The conventional side impact air bag system is provided with a vent hole to obtain an adequate pressure for absorbing the shock. However, since the vent hole in the conventional air bag is formed at positions and in number in consideration of preventing vibration or the like during inflation, it has a problem that gas discharge becomes inappropriate and the desired internal pressure and inflation cannot be obtained. That is, if the gas discharge is too fast, the air bag cannot be positively inflated in a small space between the vehicle body and the passenger. Further, there is a danger that the vent hole is closed by a door trim or the like during inflation, gas discharge becomes insufficient, the desired internal pressure is not obtained, and an appropriate pressure for absorbing the shock is not obtained. That is, if the pressure in the air bag is too high, a shock to the passenger due to the pressure of air bag inflation is too high, thus the shock cannot be absorbed.

With a view to eliminate the above prior art problems, a primary object of the present invention is to provide a side impact air bag system which can always provide a desired internal pressure and an inflation condition.

SUMMARY OF THE INVENTION

In accordance with the present invention, which attains the above object, there is provided a side impact air bag having a bag inflated between the side of the vehicle and a passenger by a gas blown out from a gas generating device, the bag comprising internal pressure adjusting means positioned inside the bag for adjusting a pressure inside a position of the bag opposing the chest of the passenger as compared to a position opposing the abdomen of the passenger to a lower pressure when the bag inflates, whereby when the bag is inflated, the pressure of the position opposing the chest is reduced while maintaining the pressure of the position opposing the abdomen, achieving both inflation in a small space and shock absorptivity.

The internal pressure adjusting means includes at least one vent hole formed in the bag. The vent hole is formed on a side surface which is away from the gas generating device and opposite to the passenger when the bag is inflated, and gas discharge from the position opposing the chest is facilitated by the vent hole.

The vent hole is formed at a position where it does not make contact with structural members of the vehicle compartment when the bag is inflated. Further, the bag comprises a bag main body opposing the passenger's abdomen and an inflation unit at the position opposing the passenger's chest, a second vent hole being formed in the inflation unit in the vicinity of the boundary of the bag main body and the inflation unit. Still further, the second vent hole is formed at a position where it does not make contact with vehicle compartment structural members when the bag is inflated.

DESCRIPTION OF THE PREFERRED EMBODIMENTS

Figure 1:
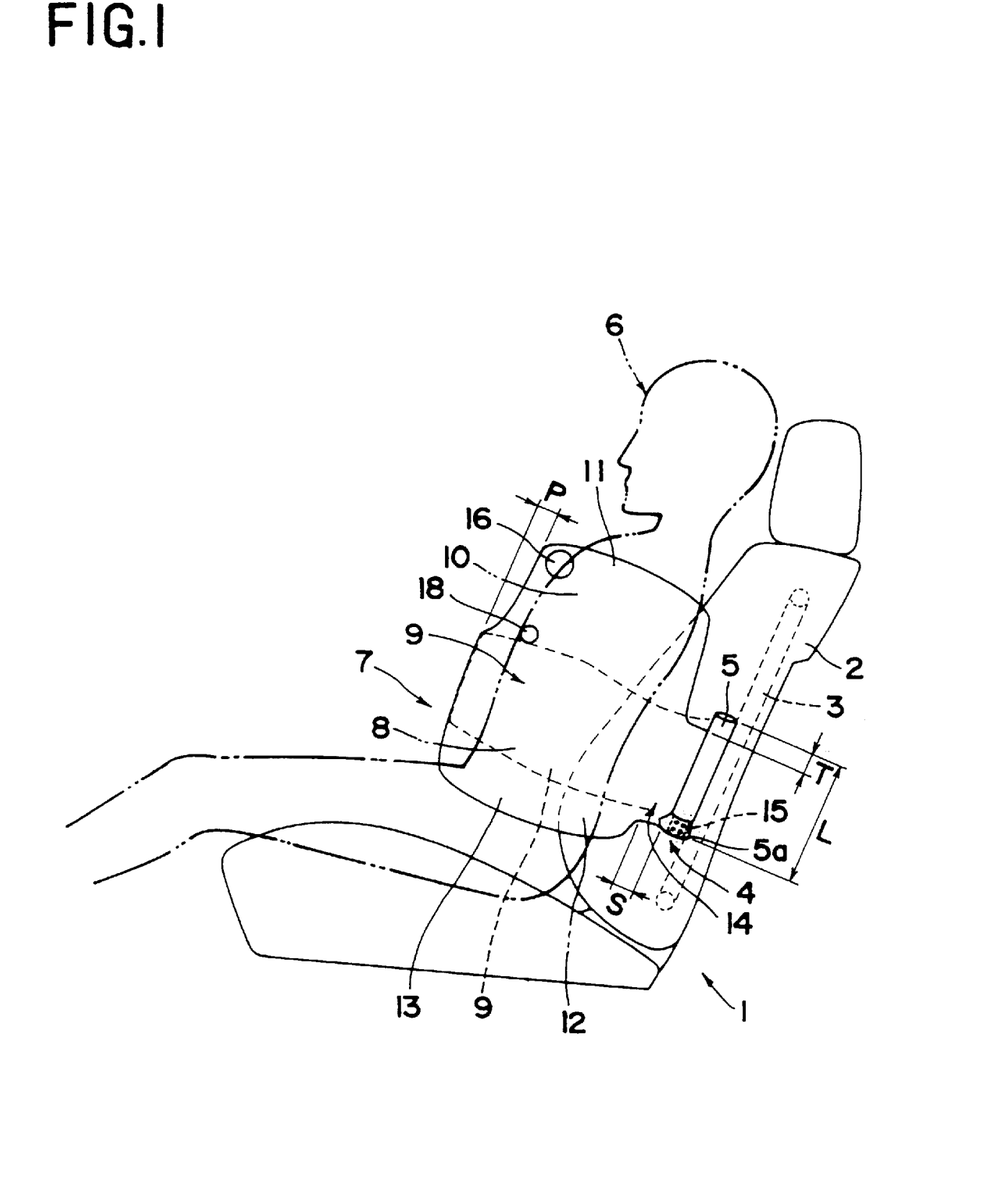
FIG. 1 is a schematic side view showing an embodiment of the side impact air bag system according to the present invention.
Figure 2:
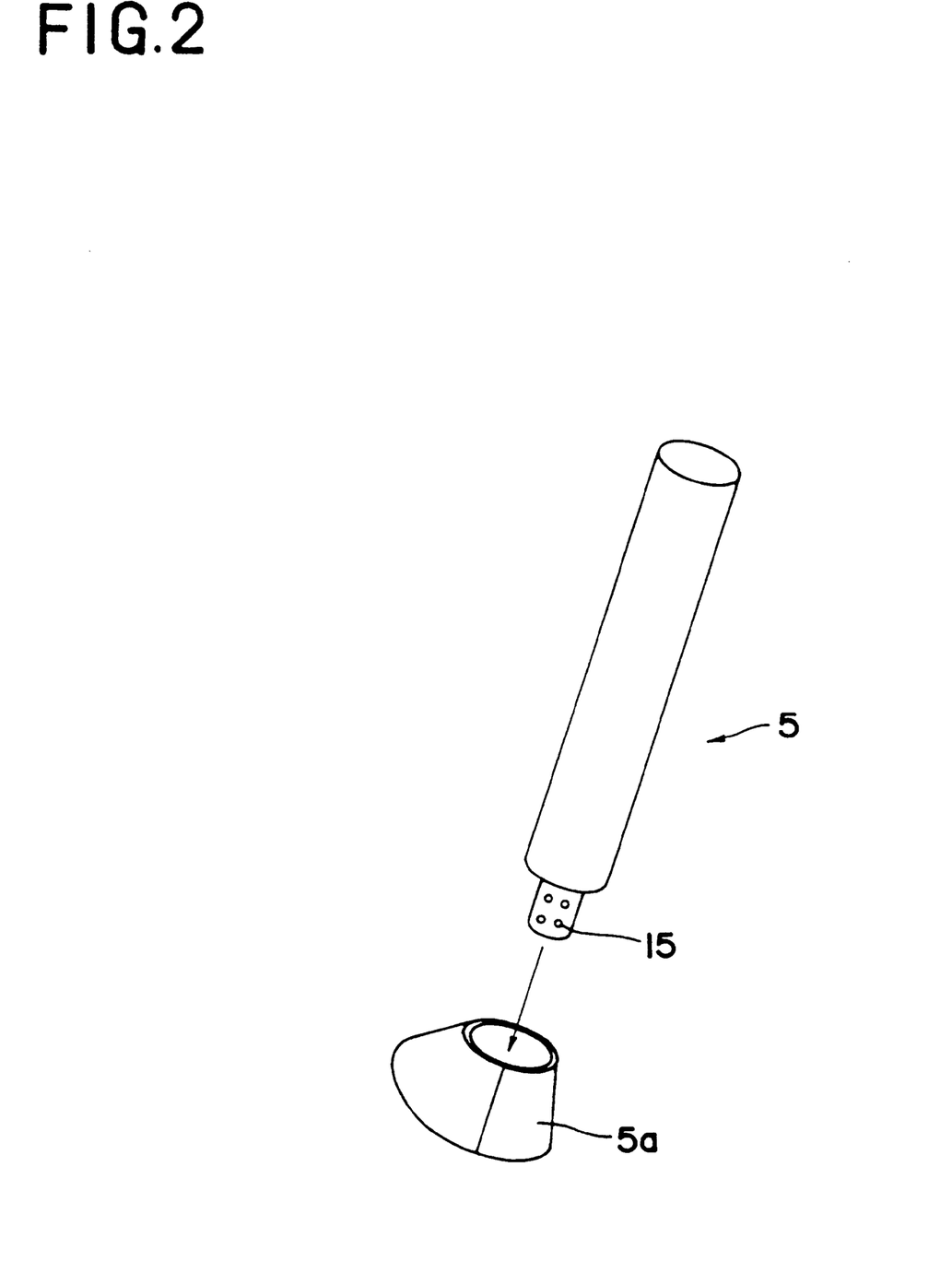
FIG. 2 is a schematic exploded perspective view of an inflator.
Figure 3:
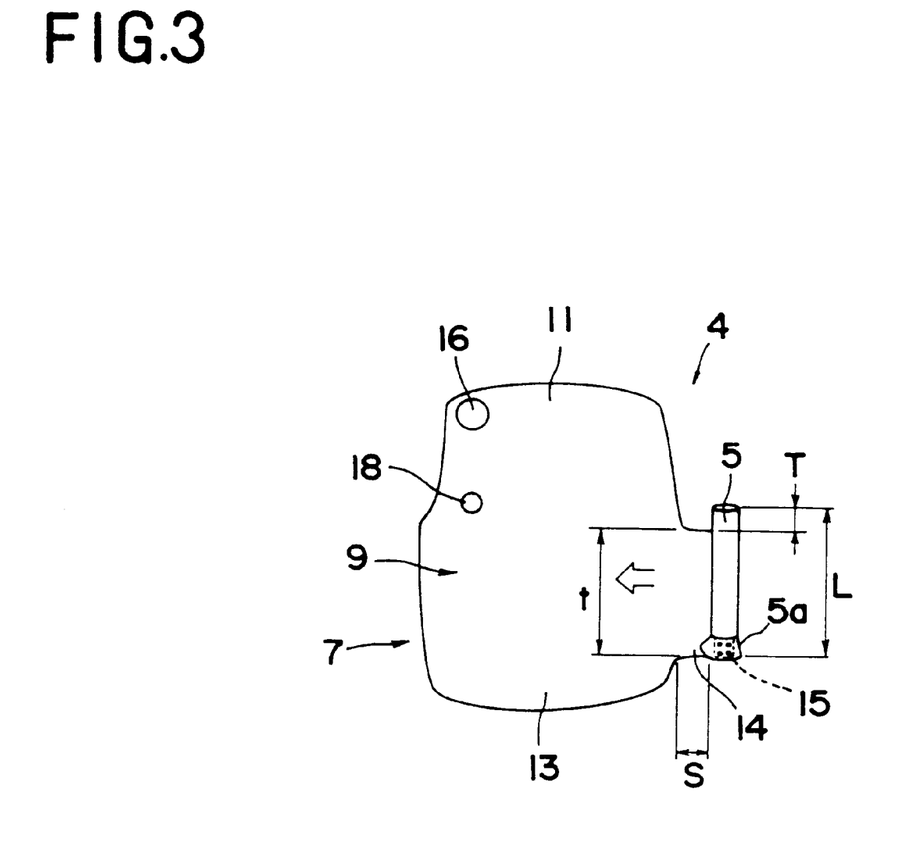
FIG. 3 is a schematic side view of the bag.
Figure 4:
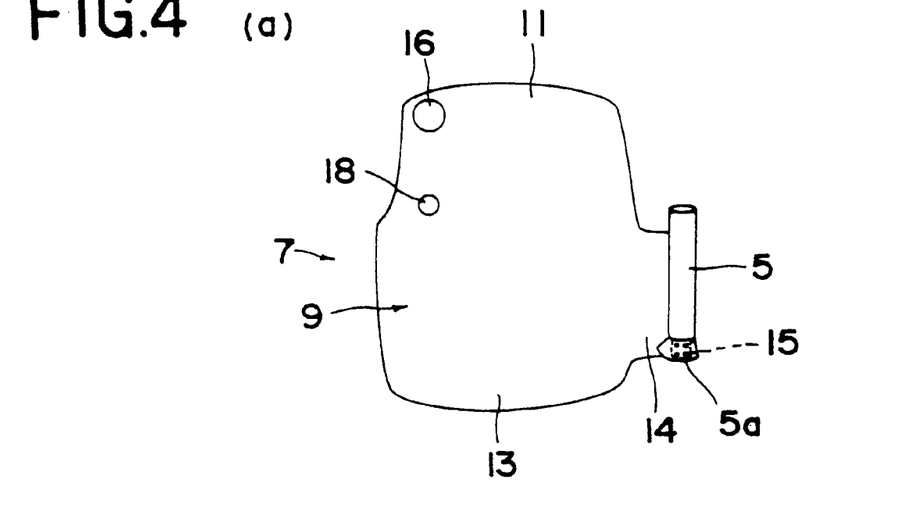
FIGS. 4(a)–4(c) are schematic views of a folded bag.
Figure 5:
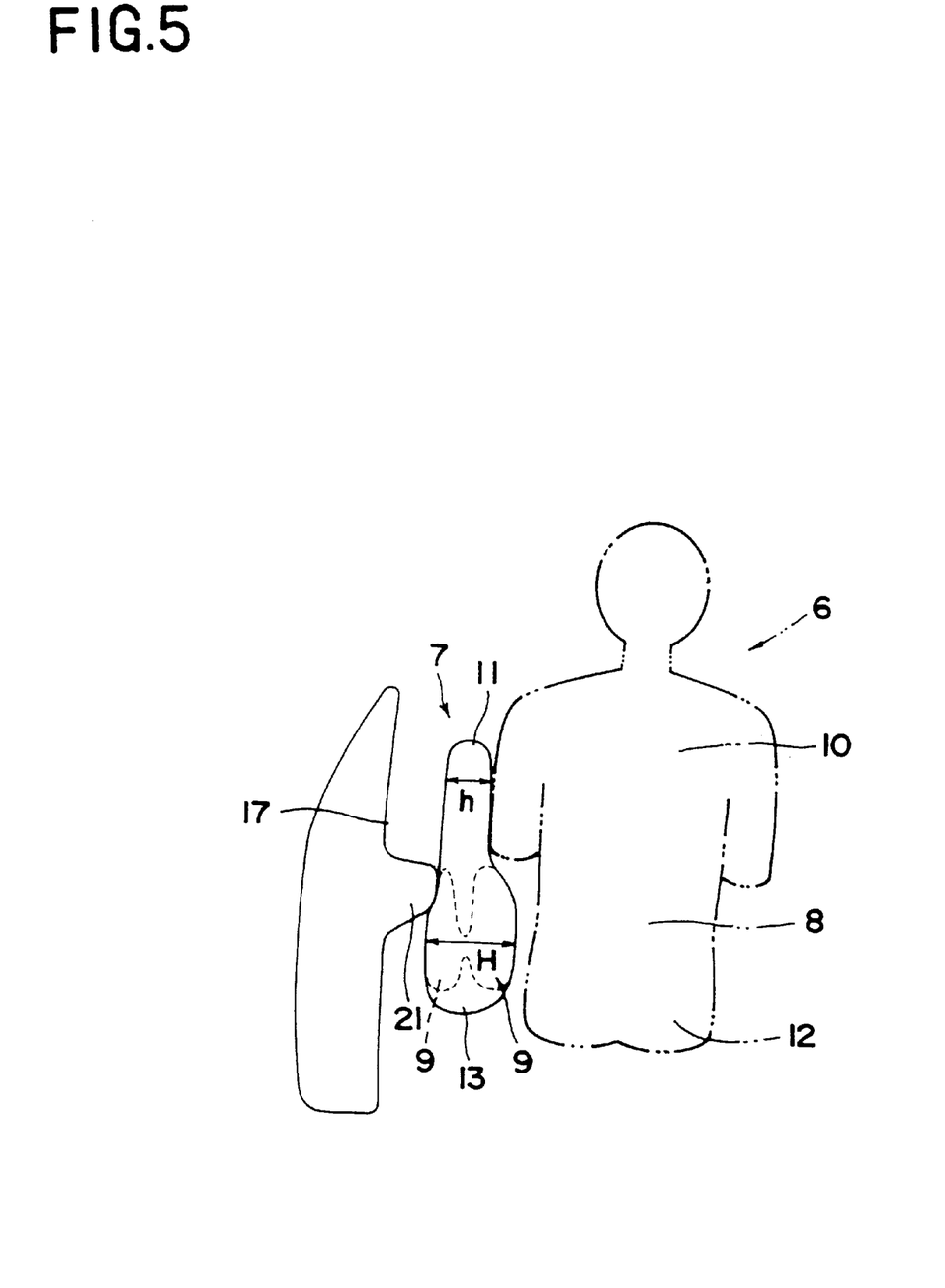
FIG. 5 is a schematic rear view showing the relationship between the side of the vehicle and the passenger when the bag is inflated.
Figure 6:
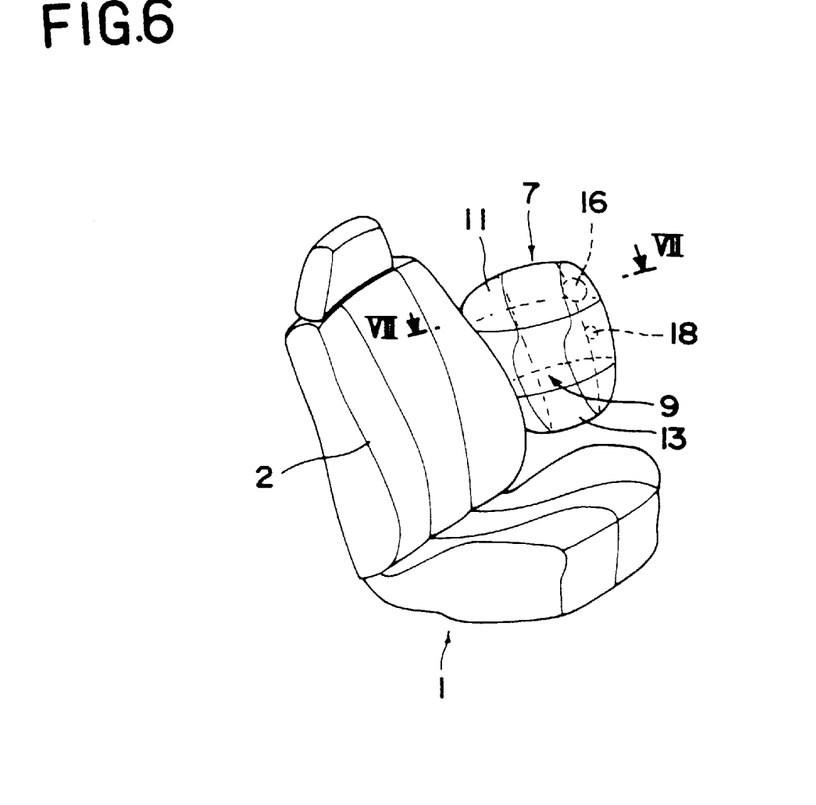
FIG. 6 is a schematic perspective view when the bag is inflated.
Figure 7:
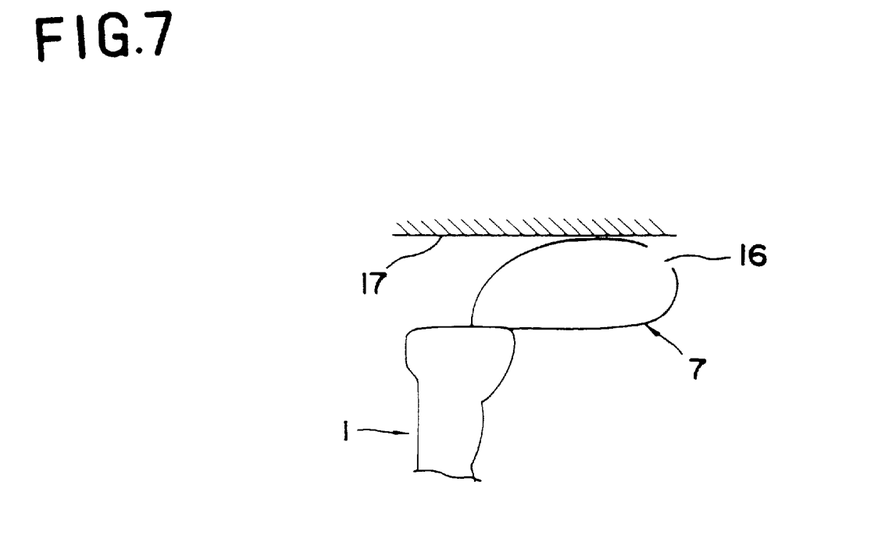
FIG. 7 is a schematic cross-sectional view taken along line VII—VII in FIG. 6.

FIG. 1 is a schematic side view showing an embodiment of the side impact air bag system according to the present invention; FIG. 2 is a schematic exploded perspective view of an inflator; FIG. 3 is a schematic side view of the bag; FIGS. 4(a)–4(c) are a schematic view of a folded bag; FIG. 5 is a schematic view showing the relationship between the side of the vehicle and the passenger as viewed from the rear of the vehicle when the bag is inflated; FIG. 6 is a schematic perspective view when the bag is inflated; and FIG. 7 is a schematic cross sectional view taken along line VII—VII in FIG. 6.

As shown in FIG. 1, a frame 3 of a seat back 2 in a vehicle seat 1 is provided with a side impact air bag system 4. The side impact air bag system 4 has a bag 7 which is inflated between the side of the vehicle and a passenger 6 by a gas blown from an inflator 5 as a gas generating device. The bag 7 comprises a main body 9 for covering a side of an abdomen portion 8 of the passenger 6 when inflated; an upper inflation unit 11 as an inflation unit which, when inflated, protrudes upward above the main body 9 to cover the side surface of a chest 10 (the rib portion) of the passenger 6; and a lower inflation unit 13 for covering the lower part of an abdomen portion 8 and part of a waist portion 12 of the passenger 6. The bag 7 is connected to the inflator 5 through a gas intake portion 14 for suppressing diffusion of the gas blown out from the inflator 5.

As shown in FIGS. 1 and 2, the inflator 5 is cylindrically formed and charged with compressed gas, and a blowing ports 15 for blowing the gas is provided at the lower portion of the inflator 5. The blowing ports 15 are located at a height approximately the same as the abdomen portion 8 of the passenger 6, and an umbrella-formed guide member 5a is provided at the lower portion of the inflator 5 for covering the blowing ports 15 and guiding the blown gas downward, that is, to the lower inflation unit 13. By the guide member 5a, the gas blown out from the blowing ports 15 is positively guided to the lower inflation unit 13 (lower portion), thereby positively guiding the gas to the part of the bag 7 opposing the abdomen portion 8 of the passenger 6.

Further, the guide member Sa is attached to the lower portion of the inflator 5 to guide the gas blown out from the blowing ports 15 to the lower inflation unit 13 and to the part of the bag 7 opposing the abdomen portion 8 of the passenger 6. However, alternatively, it is also possible to omit the guide member 5a depending on the position of the blowing ports 15. Still further, the lower inflation unit 13 of the bag 7 can also be formed to cover the entire waist portion 12 of the passenger 6.

The upper inflation unit 11 of the bag 7 is provided with a first vent hole 16 as internal pressure adjusting means so that the gas is appropriately discharged from the first vent hole 16 to obtain an appropriate pressure inside the bag 7 for absorbing the shock when the bag 7 is inflated. The first vent hole 16, as shown in FIGS. 6 and 7, is formed at a position away from the inflator 5 when the bag 7 is inflated and on the upper portion (upper inflation unit 11) on the side surface opposite to the passenger 6. Furthermore, the first vent hole 16 is formed at a position where the bag 7, when inflated, does not make contact with a door trim 17 as a vehicle compartment structural member, that is, at the tip portion where the inflated bag 7 is R-shaped when inflated.

Further, a second vent hole 18 having a smaller diameter than the first vent hole 16 is formed in the upper inflation unit 11 in the vicinity of the boundary of the main body 9 of the bag 7 and the upper inflation unit 11, the second vent hole 18 is also formed at a position where the bag 7, when inflated that, does not make contact with the door trim 17 as a vehicle compartment structural member, that is, at the tip portion where the inflated bag 7 is R-shaped when inflated.

In the above-described embodiment, the first vent hole 16 is described as an example of internal pressure adjusting means. However, it is not limited to the first vent hole 16, but it is possible to use a system which maintains the pressure of the position in the bag 7 opposing the chest portion 10 of the passenger 6 at a smaller value when the bag 7 is being inflated.

Next, the gas intake portion 14 will be described. As shown in FIG. 3, the gas intake portion 14 is formed at a position lower by a width T from the top end of the inflator 5 and has a width t from the bottom end of the inflator 5. Further, the gas intake portion 14 extends toward the main body 9 by a predetermined distance S and continuing to the bag 7. In other words, in the gas intake portion 14 of the bag 7, the portion of the bag 7 connecting the bag 7 to the inflator 5 is shorter than the length of the inflator 5. With the gas intake portion 14, the gas from the inflator 5 is blown forward to the position of the main body 9 without diffusion.

Figure 8:
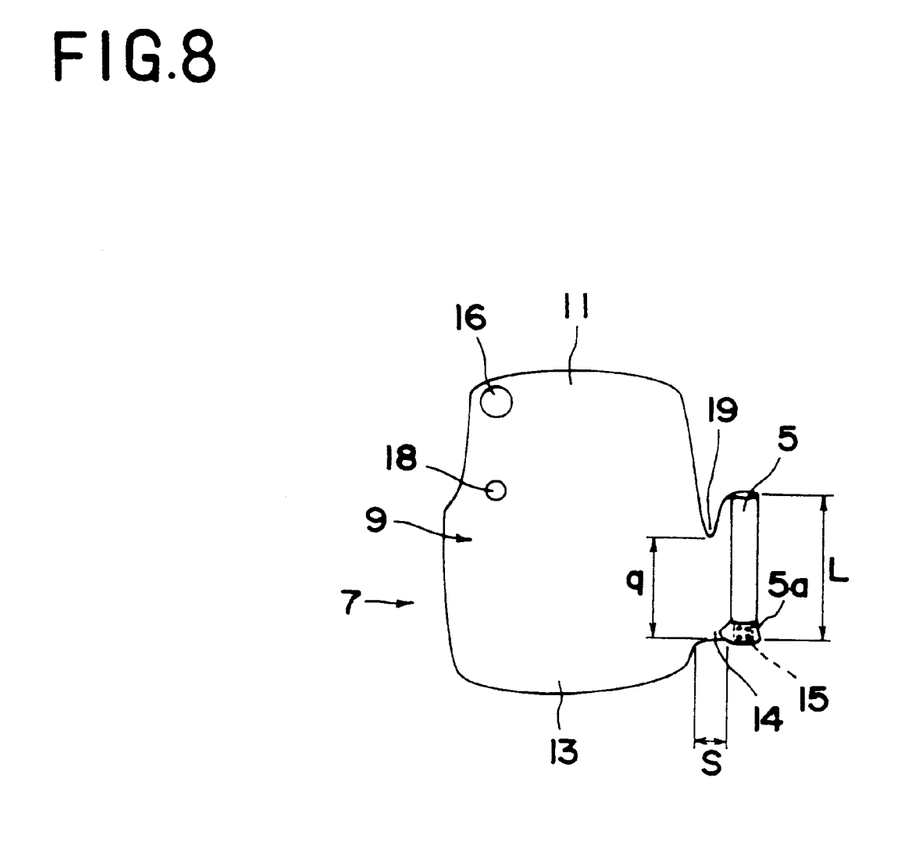
FIG. 8 is a schematic side view showing another embodiment of a gas intake portion.

Alternatively, the gas intake portion 14 may be formed so that the width t is extended to a length L in the vertical direction of the inflator 5. Also, in this case, the gas intake portion 14 extends toward the main body 9 by a predetermined distance S and continues to the bag 7. Further, as shown in FIG. 8 showing the side view of the bag 7, a narrowed portion 19 having a width q shorter than the vertical length L of the inflator 5 may be provided so that the gas intake portion 14 is connected to the top and bottom ends of the inflator 5 and extended by the predetermined distance S in a horizontal direction. The position of the narrowed portion 19 can be appropriately set to suppress diffusion of the gas blown out from the inflator 5 and regulate the blowing of the gas to an optional direction.

On the other hand, as shown in FIG. 1, the tip in the longitudinal direction (direction separating from the inflator 5) of the upper inflation unit 11 of the bag 7 is made shorter by a length P than the main body 9. The length of the upper inflation unit 11 is shortened as compared with the length of the main body 9 in the direction away from the inflator 5 by shortening the connection of the gas intake portion 14 to the inflator 5 and by cutting the tip of the upper inflation unit 11. By shortening the length of the upper inflation unit 11 as compared with the main body 9, as shown in FIG. 5, a width h of the upper inflation 11 becomes narrower than a width H of the main body 9 when the bag 7 is inflated.

As a structure of the member for narrowing the width of the upper inflation unit 11, as shown in FIG. 9(a) showing a side view of the bag 7 and in FIG. 9(b) showing a cross sectional view in FIG. 9(a), it is possible to attach both ends of a strap 20 to the inner surface of the upper inflation unit 11. In this case, a length M of the strap 20 is shorter than the width H of the main body 9 when it is inflated (FIG. 9(b)). Thus, in the upper inflation unit 11, inflation in the width direction is suppressed by the strap 20, and the width h, when the upper inflation unit 11 is inflated, is narrower than the width H of the main body 9.

In the above-described embodiment, the width of the upper inflation unit 11 when inflated is narrower than the width of the main body 9. However, at least the width of the boundary of the upper inflation unit 11 and the main body 9 may be narrower than the main body.

Folding condition of the bag 7 will be described with a reference to FIGS. 4(a) and 4(c). As shown in FIGS. 4(a) and (b), the upper inflation unit 11 and the lower inflation unit 13 are individually folded and vertically contained within the main body 9, so that the folded cross section is nearly U-shaped. In this case, the first vent hole 16 is contained inside the main body 9. As shown in FIG. 4(c), after the upper inflation unit 11 and the lower inflation unit 13 are folded in the main body 9, the bag 7 is folded successively in bellows towards the inflator 5.

Figure 10:
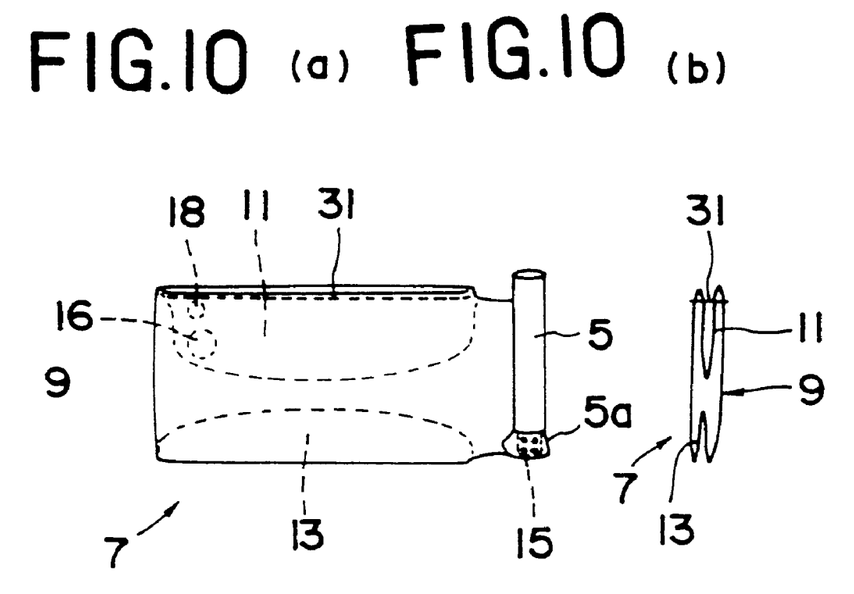
FIGS. 10(a)–(b) are schematic views for explaining an embodiment of a bag temporarily sewn at the upper edge of the bag main body.

Further, as shown in FIGS. 10(a) and (b), it is possible to temporarily sew the upper edge of the main body 9 of the position where the upper inflation unit 11 is folded inside the main body 9 to connect as a sewn portion 31 (separates above a predetermined pressure). By connecting the upper edge of the main body 9 as the sewn portion 31, upward diffusion of the gas from the inflator 5 is suppressed when the bag 7 is inflated, and the gas blown out from the inflator 5 is ejected towards the position of the main body nearly of the front side. Still further, it is also possible to directly join the upper edge of the main body 9 with an adhesive or the like rather than by sewing.

The bag 7 contained as above is inflated by the gas blown out from the inflator 5 when a side impact is detected by detection means (not shown).

Operation of the side impact air bag system 4 of the above arrangement will be described.

When a side impact of the vehicle is detected by detection means (not shown), the gas in the inflator 5 is blown out from the blowing ports 15 to begin inflation of the bag 7. The gas blown out from the blowing ports 15 is guided by the guide member 5a to the lower portion of the bag 7 and diffusion is suppressed by the gas intake portion 14 to be ejected towards the front side. As a result, first, the part of the main body 9 of the bag 7 (part opposing the abdomen portion 8 of the passenger 6) is momentarily inflated by a high pressure (condition from FIGS. 4(c) to (b) and see the dotted line portion in FIGS. 1 and 5), and the main body 9 enters between the door trim 17 or the arm rest 21 and the passenger 6.

By the entry of the main body 9 between the door trim 17 or the arm rest 21 and the passenger 6, the abdomen portion, having a higher shock load resistance than the chest portion 10, is pressed to move the passenger 6 away from the door trim 17 or the arm rest 21. This presses the passenger 6 in the same direction of the movement into the vehicle compartment of the door trim 17 (arm rest 21) at side impact, thereby relaxing the relative velocity to the deformation.

Further, as shown in FIGS. 10(a)–10(b), by joining the upper edge of the main body 9 by the sewn portion 31, diffusion of the blown gas is suppressed even further, which is combined with the suppressing action by the gas intake portion 14 to positively eject the gas to the front side, and inflation of the part of the bag 7 at the desired position, that is, the part opposing the abdomen portion 8.

By guiding the gas blown out from the blowing ports 15 of the inflator 5 downward by the guide member 5a and by suppressing diffusion of the gas by the gas intake portion 14, the main body 9 opposing the abdomen portion 8 which is higher in shock load resistance than the chest portion 10 is inflated. In other words, the desired portion of the bag can be positively inflated between the door trim 17 (armrest 21) and the passenger 6. This inflates the bag 7 in the narrow space momentarily by a high pressure, thereby relaxing the relative velocity with respect to the movement of the vehicle structural members into the vehicle compartment.

Next, when the gas is continuously blown from the blowing ports 15 of the inflator 5 into the bag 7, the upper inflation unit 11 and the lower inflation unit 13 are inflated in upward and downward directions, respectively, from the inside of the main body 9 (see condition from FIGS. 4(b) to (a) and the dotted line portion of FIGS. 1 and 5), and the upper inflation unit 11 is inflated between the door trim 17 and the chest portion 10 of the passenger 6. Further, the lower inflation unit 13 is inflated between the door trim 17 and part of the waist portion 12 of the passenger 6.

At this moment, since the upper inflation unit 11 and the lower inflation unit 13 are inflated upward and downward directions, respectively, they are inflated without interfering with the door trim 17 or the arm rest 21. Further, as shown in FIGS. 6 and 7, since the first vent hole 16 and the second vent hole 18 are formed at the tip portion which becomes R-shaped when the bag 7 is inflated, the upper inflation unit 11 is inflated without closing the first vent hole 16 and the second vent hole 18 by the door trim 17 or the arm rest 21. This maintains the gas blowing appropriately to obtain an appropriate pressure inside the bag 7.

In the process of inflating the upper inflation unit 11, the internal volume of the bag 7 is increased as the upper inflation unit 11 is inflated from the main body 9, and the gas is discharged from the second vent hole 18 in the predetermined condition, thereby obtaining an appropriate pressure to absorb the shock. Further, in the process of inflating the upper inflation unit 11, discharging of gas is carried out from the second vent hole 18 in the vicinity of the boundary of the main body 9 and the upper inflation unit 11, that is, in the vicinity of the part opposing the lower portion of the chest portion (the lowest rib). Still further, when the bag 7 is fully inflated, since the connection of the gas intake portion 14 to the inflator 5 is shortened and the length of the upper inflation unit 11 is shortened compared with the main body 9, as shown in FIG. 5, the width h of the upper inflation unit 11 becomes narrower than the width H of the main body 9.

Consequently, since an appropriate pressure for absorbing the shock is produced between the door trim 17 and the chest portion 10 which is lower in shock load resistance than the abdomen portion 8, and the upper inflation unit 11 having the reduced width inflates, the bag 7 can be inflated without exerting a shock on the chest portion to absorb the shock force due to the movement of the door trim 17 (arm rest 21) in the direction of the vehicle compartment. Further, gas in the vicinity of the boundary of the main body 9 and the upper inflation unit 11 is discharged, thereby relaxing the shock at the time the bag 7 begins to contact the lower portion of the chest portion 8 (the lowermost rib).

Figure 9:
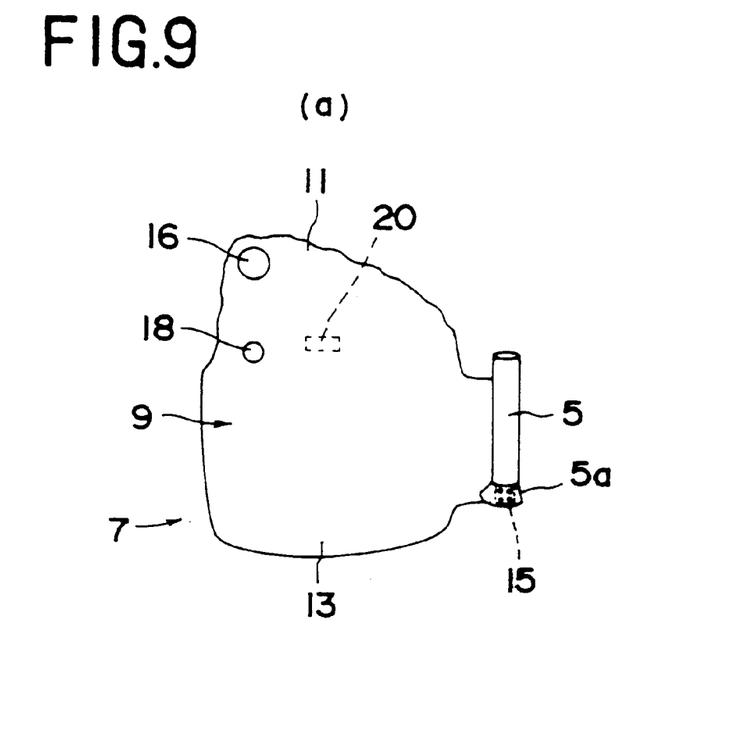
FIGS. 9(a)–(b) are schematic views for explaining an embodiment of a bag having a reduced width in the upper inflation unit by a strap.

Yet further, as shown in FIG. 9, even when the width h of the upper inflation unit 11 is made smaller than the width H of the main body 9 by using the strap 20, the bag 7 can be inflated similarly without exerting a high shock on the chest portion 10, thereby absorbing the shock force to the deformation of vehicle body structural members.

Since, in the above-described side impact air bag system 4, the gas from the inflator 5 is blown towards the lower portion of the bag 7 and diffusion of the gas is suppressed by the gas intake portion 14, when a side impact occurs, inflation of the bag 7 is begun by a high pressure from the part of the main body 9 opposing the abdomen portion 8 which is higher in shock load resistance than the chest portion 10. In other words, the bag 7 inflates from a portion other than the part opposing the chest portion 10 having lower shock load resistance, so that the bag 7 contacts the abdomen portion 8 and does not make contact with the chest portion 10 during inflation under high pressure. Therefore, the bag 7 can be momentarily and positively inflated in the narrow space between the door trim 17 (arm rest 22) and the passenger 6 to press the passenger 6 toward the inside of the compartment, and thereby relax the relative velocity with respect to the movement of the door trim 17 (armrest 22) toward the vehicle compartment.

Yet further, after the main body 9 opposing the abdomen portion 8 is inflated, when inflation of the upper inflation unit 11 from the main body 9 begins, since while gas discharge in the vicinity of the boundary of the main body 9 and the upper inflation unit 11 is carried out by the second vent hole 18 in association with inflation of the upper inflation unit 11, gas is discharged from the first vent hole 16 in the predetermined condition, when the upper inflation unit 11 is inflated from the inside of the main body 9, the upper inflation unit 11 having a smaller width than that of the main body 9 is inserted between the door trim 17 and the chest portion 10 with a slightly reduced internal pressure of the upper inflation unit 11. Therefore, the internal pressure of the upper inflation unit 11 is appropriately adjusted, so that the bag 7 can be inflated without applying a high shock to the chest portion 10 and the shock force to the movement of the door trim 17 into the vehicle compartment be absorbed.

Yet further, since the upper inflation unit 11 and the lower inflation unit 13 are inflated in the vertical direction from the condition folded within the main body 9, there is no danger of the upper inflation unit 11 and the lower inflation unit 13 interfering with the door trim 17 or the arm rest 21, and inflation of the bag 7 is not disturbed. Yet further, since the first vent hole 16 and the second vent hole 18 are provided at positions not affected by deformation of the door trim 17, the first vent hole 16 and the second vent hole 18 will not be closed even if the door trim 17 is deformed towards the inside of the vehicle compartment. Therefore, gas discharge at inflation is not disturbed, and the desired internal pressure can always be obtained.

As described above, the inflation direction of the main body 9 can be regulated towards the abdomen portion 8 into the desired condition, and the restraining condition of the passenger 6 can be improved. Further, gas blowing in a direction from the inflator 5 is regulated by the gas intake portion 14, so that blowing of high pressure gas to the upper inflation unit 11 opposing the chest portion is prevented, and the restraining condition of the passenger 6 can be improved.

Yet further, the internal pressure of the bag 7 is appropriately adjusted by means of the first vent hole 16 and the second vent hole 18, and the width of the upper inflation unit 11 is narrowed compared with the main body 9, so that the bag 7 can be inflated without exerting a high shock on the chest portion 10. Since the first vent hole 16 and the second vent hole 18 will not be closed by vehicle body structural members, the desired internal pressure is always obtained and the restraining condition of the passenger 6 will not be deteriorated. Still further, by inflating the upper inflation unit 11 and the lower inflation unit 13 in vertical directions, a danger of the bag 7 interfering with the door trim 17 or the arm rest 21 at inflation can be eliminated.

Since the side impact air bag system according to the present invention is provided with internal pressure adjusting means for reducing the pressure opposing the chest portion compared to the pressure of the part opposing the abdomen portion of the passenger when the bag is inflated, the pressure of the part opposing the chest portion can be reduced while maintaining the pressure of the part opposing the abdomen portion by the internal pressure adjusting means when the bag is inflated. Therefore, both of inflation in the small space and the shock absorptivity can be simultaneously obtained to always obtain the desired internal pressure and inflation condition, thus improving the restraining condition of the passenger.

Yet further, since the first vent hole and the second vent hole are used as the internal pressure adjusting means, and the first vent hole and the second vent hole are formed away from the gas generating device when the bag is inflated and on the upper side surface opposite to the passenger, early discharge of the gas is prevented and appropriate gas discharge of the part opposing the chest portion is achieved by the vent hole and the second vent hole. As a result, the desired internal pressure and inflation condition can always be obtained to positively inflate the bag and relax the shock to the chest portion. Further, since the vent hole and the second vent hole are formed at positions not make contacting with vehicle compartment structural members at inflation, the vent hole and the second vent hole will not be closed even if the vehicle compartment structural members are deformed to the inside of the vehicle compartment, gas discharge at inflation is not disturbed, and the desired internal pressure condition can always be obtained.

What is claimed is:

1. A side impact air bag system, said system including an air bag inflated between the side of a vehicle and a passenger by a gas blown out from a gas generating device, said air bag comprising:

a first portion opposing an abdomen portion of the passenger when inflated;

a second portion opposing a chest portion of the passenger when inflated; and internal pressure adjusting means for adjusting a pressure within said air bag to achieve a pressure in said second portion that is lower than a pressure in said first portion when said air bag is inflated, the internal pressure adjusting means including at least two pressure releasing holes of different size that are defined in the second portion of the air bag.

2. The side impact air bag system of claim 1, wherein said internal pressure adjusting means includes openings formed in said air bag for adjusting the pressure in said air bag by discharging the gas from said air bag when said air bag is inflated.

3. The side impact air bag system of claim 2, wherein said openings are formed on a surface away from the gas generating device and opposite to the passenger so that said openings separate from said gas generating device when said air bag is inflated.

4. The side impact air bag system of claim 2, wherein said openings are formed at positions not contacting vehicle compartment structural members when said air bag is inflated.

5. The side impact air bag system of claim 2, wherein at least one of said openings is formed in an upper part of said second portion.

6. The side impact air bag system of claim 5, wherein at least one opening is provided in said second portion in the vicinity of a boundary of said first portion and said second portion.

7. The side impact air bag system of claim 2, wherein said openings are vent holes formed in said air bag.

8. The side impact air bag system of claim 1, further comprising:

a third portion opposing a waist portion of the passenger when inflated.

9. The side impact air bag system of claim 1, wherein said second portion is being folded inside said first portion prior to the inflation of the bag.

10. The side impact air bag system of claim 9, wherein an upper portion of said first portion is being sewn when said second portion is being folded inside of said first portion.

11. The side impact air bag system of claim 1, wherein a thickness of said first portion is greater than a thickness of said second portion.

12. The side impact air bag system of claim 11, wherein the thickness of said second portion is restricted by a strap disposed inside said second portion, said strap connecting opposing sides of said second portion.

13. The side impact air bag system of claim 1, wherein said first portion is inflated prior to said second portion.

14. A side impact air bag system, comprising:

an air bag having
- a first portion opposing an abdomen portion of a passenger when deployed,
- a second portion formed above said first portion, said second portion opposing a chest portion of the passenger when deployed, and
- a delaying device which deploys said second portion after said first portion is deployed; and a gas generating device which provides gas to deploy said air bag, wherein said bag further includes a pressure reducing device which reduces pressure inside said second portion as compared to said first portion when said air bag is deployed, the internal pressure adjusting means including at least two pressure releasing holes of different size that are defined in the second portion of the air bag.

15. A side impact air bag system, comprising:

an air bag comprising first and second portions respectively opposing an abdominal region and a chest region of a passenger when deployed, the second portion of the air bag having a surface that defines at least two pressure releasing holes of different size; and an inflating device that provides gas to deploy and inflate the air bag, the inflating device providing gas in a direction of the first portion of the air bag, wherein the second portion is inflated based on gas that is redirected from the first portion after being provided by the inflating device.

16. The side impact air bag system of claim 15, wherein the air bag further comprises a third portion that is adjacent to the first portion and positioned on a side of the first portion that is opposite a position of the second portion, the third portion being inflated based on gas that is redirected from the first portion after being provided by the inflating device.

17. The side impact air bag system of claim 15, further comprising:

a vent located in an surface portion of the air bag enabling gas to be released from the second portion of the air bag, wherein a pressure differential exists between the first and second portions of the air bag when inflated.

18. The side impact air bag system of claim 17, wherein the vent is internal pressure adjusting means, and wherein a pressure within the second portion is lower than a pressure within the first portion when inflated.

* * * * *